US009641649B2

(12) United States Patent
Perreault et al.

(10) Patent No.: US 9,641,649 B2
(45) Date of Patent: May 2, 2017

(54) IGMP/MLD TRANSLATION

(71) Applicant: Futurewei Technologies, Inc., Plano, TX (US)

(72) Inventors: Simon Perreault, Quebec (CA); Ting Zou, Cupertino, CA (US); Zhongjian Zhang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 155 days.

(21) Appl. No.: 13/773,470

(22) Filed: Feb. 21, 2013

(65) Prior Publication Data
US 2013/0215891 A1 Aug. 22, 2013

Related U.S. Application Data

(60) Provisional application No. 61/601,338, filed on Feb. 21, 2012.

(51) Int. Cl.
*H04L 29/06* (2006.01)
*H04L 12/781* (2013.01)
*H04L 12/761* (2013.01)

(52) U.S. Cl.
CPC ............. *H04L 69/08* (2013.01); *H04L 45/16* (2013.01); *H04L 45/52* (2013.01)

(58) Field of Classification Search
None
See application file for complete search history.

(56) References Cited

U.S. PATENT DOCUMENTS

| 2001/0053156 A1* | 12/2001 | Higuchi ................. H04L 12/18 370/466 |
| 2005/0068981 A1* | 3/2005 | Park et al. ..................... 370/466 |
| 2005/0180448 A1* | 8/2005 | Kobayashi ............ H04L 12/185 370/432 |

(Continued)

FOREIGN PATENT DOCUMENTS

| CN | 101005390 A | 7/2007 |
| CN | 101369994 A | 2/2009 |

OTHER PUBLICATIONS

Deering et al., "Internet Protocol, Version 6 (IPv6) Specification", RFC 2460, Dec. 1998.*

(Continued)

*Primary Examiner* — Jae Y Lee
*Assistant Examiner* — Thinh Tran
(74) *Attorney, Agent, or Firm* — Conley Rose, P.C.

(57) ABSTRACT

Disclosed is an apparatus comprising a network element (NE) configured to receive an Internet Group Management Protocol (IGMP) data packet in Internet Protocol version four (IPv4) format, translate the data packet into an Multicast Listener Discovery (MLD) data packet in Internet Protocol version six (IPv6) format, and forward the translated data packet. Also disclosed is an apparatus comprising a NE configured to receive an MLD data packet in IPv6 format, and translate the data packet into an IGMP data packet in IPv4 format. Also disclosed is a method comprising receiving a plurality of data packets, wherein the plurality of data packets comprise IGMP data packets and MLD data packets, translating at least one of the IGMP data packets into a MLD data packet, and translating at least one of the MLD data packets into an IGMP data packet.

15 Claims, 7 Drawing Sheets

(56) References Cited

U.S. PATENT DOCUMENTS

| | | | |
|---|---|---|---|
| 2007/0171930 | A1 | 7/2007 | Kamata et al. |
| 2013/0007291 | A1* | 1/2013 | Nickols .................... 709/228 |
| 2013/0094505 | A1* | 4/2013 | Sarikaya ............. H04L 12/184 |
| | | | 370/390 |

OTHER PUBLICATIONS

Wang, Q., et al., Multicast Extensions to DS-Lite Technique in Broadband Deployments, Softwire WG, Internet Draft, draft-ietf-softwire-dslite-multicast-01, Oct. 31, 2011, 19 pages.*
Tsuchiya, K., et al, "An IPv6/IPv4 Multicast Translator Based on IGMP/MLD Proxying (mtp)," Internet Draft, draft-ietf-ngtrans-mtp-03, Oct. 15, 2002, 14 pages.*
Kiviniemi, T., "Implementation of an IPv4 to IPv6 Multicast Translator," Helsinki University of Technology, Faculty of Information and Natural Sciences, Department of Computer Science and Engineering, Master's Thesis, Espoo, Oct. 25, 2009, 81 pages.*
U.S. Appl. No. 61/547,921, "Multicast Support for Internet Protocol Version Four Rapid Deployment", Oct. 2011.*
Foreign Communication From a Counterpart Application, PCT Application PCT/US2013/027185, International Search Report dated on Jun. 3, 2013, 5 pages.
Foreign Communication From a Counterpart Application, PCT Application PCT/US2013/027185, Written Opinion dated on Jun. 3, 2013, 6 pages.
Le Faucheur, F., "IP Router Alert Considerations and Usage," RFC 6398, Internet Engineering Task Force, XP-015081321, Geneva, Switzerland, Oct. 27, 2011, 19 pages.
Tsou, T., et al., "Use Cases for Multicast Transition From IPv4 to IPv6," draft-tsou-multrans-use-cases-00.txt, Internet Engineering Task Force, XP-015077790, Geneva, Switzerland, Aug. 25, 2011, 14 pages.
Zhou, C., et al., "Specification of a Provider-Managed Adaptive Function Between a Multicast Receiver and a Provider Network Supporting a Different IP Version," draft-zhou-multrans-af1-specification-00.txt, Internet Engineering Task Force, XP-015079787, Dec. 15, 2011, 6 pages.
Boucadair, M., et al., "IPv4-Embedded IPv6 Multicast Address Format," Behave WG, Internet Draft, draft-boucadair-behave-64-multicast-address-format-03, Oct. 26, 2011, 15 pages.
Katz, D., "IP Router Alert Option," Network Working Group, RFC 2113, Feb. 1997, 4 pages.
Bradner, S., "Key Words for Use in RFCs to Indicate Requirement Levels," Network Working Group, RFC 2119, Mar. 1997, 4 pages.
Conta, A., et al., "Generic Packet Tunneling in IPv6 Specification," Network Working Group, RFC 2473, Dec. 1998, 34 pages.
Partridge, C., et al., "IPv6 Router Alert Option," Network Working Group, RFC 2711, Oct. 1999, 7 pages.
Cain, B., et al., "Internet Group Management Protocol, Version 3," Network Working Group, RFC 3376, Oct. 2002, 54 pages.
Vida, R., et al., "Multicast Listener Discovery Version 2 (MLDv2) for IPv6," Network Working Group, RFC 3810, Jun. 2004, 63 pages.
Fenner, B., et al., "Internet Group Management Protocol (IGMP) / Multicast Listener Discovery (MLD)—Based Multicast Forwarding ("IGMP/MLD Proxying")," Network Working Group, RFC 4605, Aug. 2006, 13 pages.
Bao, C., et al., "IPv6 Addressing of IPv4/IPv6 Translators," Internet Engineering Task Force (IETF), RFC 6052, Oct. 2010, 19 pages.
Li, X., et al., "IP/ICMP Translation Algorithm," Internet Engineering Task Force (IETF), RFC 6145, Apr. 2011, 34 pages.
Tsuchiya, K., et al, "An IPv6/IPv4 Multicast Translator Based on IGMP/MLD Proxying (mtp)," Internet Draft, draft-tsuchiya-mtp-01.txt, Feb. 19, 2003, 15 pages.
Venaas, S., "An IPv4-IPv6 Multicast Gateway," Internet Engineering Task Force, Internet Draft, draft-venaas-mboned-v4v6mcastgw-00.txt, Feb. 2003, 7 pages.
Venaas, S., et al., "An IPv4-IPv6 Multicast Translator," Network Working Group, Internet Draft, draft-venaas-behave-mcast46-02.txt, Dec. 22, 2010, 12 pages.
Venaas, S., et al., "Framework for IPv4/IPv6 Multicast Translation," Network Working Group, Internet Draft, draft-venaas-behave-v4v6mc-framework-03.txt, Jun. 21, 2011, 24 pages.
Jiang, S., et al., "Multicast Proxy in IPv6/IPv4 Transition," v6ops Work Group, Internet Draft, draft-jiang-v6ops-v4v6mc-proxy-00.txt, Oct. 24, 2011, 9 pages.
Jiang, S., et al., "Multicast Proxy in IPv6/IPv4 Transition," v6ops Work Group, Internet Draft, draft-jiang-v6ops-v4v6mc-proxy-02.txt, Oct. 22, 2012, 8 pages.
Qin, J., et al., "Delivery of IPv4 Multicast Services to IPv4 Clients over an IPv6 Multicast Network," Softwire WG, Internet Draft, draft-ietf-softwire-dslite-multicast-04, Oct. 18, 2012, 20 pages.
Perreault, S., et al., "Internet Group Management Protocol (IGMP)/ Multicast Listener Discovery (MLD)—Based Multicast Translation ("IGMP/MLD Translation")," Network Working Group, Internet Draft, draft-perreault-mboned-igmp-mld-translation-01, Apr. 10, 2012, 17 pages.
Foreign Communication From a Counterpart Application, Chinese Application No. 201380008287.6, Chinese Office Action dated Jul. 25, 2016, 8 pages.
Foreign Communication From a Counterpart Application, Chinese Application No. 201380008287.6, Chinese Search Report dated Jul. 14, 2016, 2 pages.

* cited by examiner

500

| Type | Max Resp Code | Checksum |
|---|---|---|
| Group Address ||| 
| T\|Resv\|S\|QRV | QQIC | Number of Sources |
| Source Address [1] |||
| Source Address [2] |||
| . . . |||
| Source Address [N] |||

| Type | Code | Checksum |
|---|---|---|
| Maximum Response Code || Reserved |
| Multicast Address |||
| T\|Resv\|S\|QRV | QQIC | Number of Sources |
| Source Address [1] |||
| Source Address [2] |||
| . . . |||
| Source Address [N] |||

| Type | Reserved | Checksum |
|---|---|---|
| T\|   Reserved | | Number of Group Records |
| Group Record [1] | | |
| Group Record [2] | | |
| . . . | | |
| Group Record [M] | | |

705 points to the T field.

| Type | Reserved | Checksum |
|---|---|---|
| T\|   Reserved | | Number of Mcast Address Records |
| Multicast Address Record [1] | | |
| Multicast Addres Record [2] | | |
| . . . | | |
| Multicast Address Record [M] | | |

805 points to the T field.

FIG. 8

IGMP/MLD TRANSLATION

CROSS-REFERENCE TO RELATED APPLICATIONS

The present application claims priority to U.S. Provisional Patent Application 61/601,338, filed Feb. 21, 2012 by Simon Perreault, et al., and entitled "IGMP/MLD Translation," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Multicast network routing protocols may provide one-to-many and many-to-many distribution of data over Internet Protocol (IP) networks. Multicast protocols may allow data to be transmitted across a multicast network from a first hop router (FHR), which may be connected to a source or a rendezvous point (RP), to a last hop router (LHR), which may forward data to a client device. A client device may exchange data with the multicast network using Internet Group Management Protocol (IGMP) in an IP version four (IPv4) network or Multicast Listener Discovery (MLD) in an IP version six (IPv6) network. A node configured to interface with a multicast network may be unable to provide signaling for both an IPv4 client and a IPv6 client as MLD protocols and IGMP protocols may be mutually exclusive.

SUMMARY

In one embodiment, the disclosure includes an apparatus comprising a network element (NE) configured to receive an Internet Group Management Protocol (IGMP) data packet in Internet Protocol version four (IPv4) format, translate the data packet into an Multicast Listener Discovery (MLD) data packet in Internet Protocol version six (IPv6) format, and forward the translated data packet.

In another embodiment, the disclosure includes an apparatus comprising a NE configured to receive an MLD data packet in IPv6 format, and translate the data packet into an IGMP data packet in IPv4 format.

In yet another embodiment, the disclosure includes a method comprising receiving a plurality of data packets, wherein the plurality of data packets comprise IGMP data packets and MLD data packets, translating at least one of the IGMP data packets into a MLD data packet, and translating at least one of the MLD data packets into an IGMP data packet.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 illustrates an embodiment of an encoding of a translated IGMP version 3 (v3) query.

FIG. 6 illustrates an embodiment of an encoding of a translated MLD version 2 (v2) query.

FIG. 7 illustrates an embodiment of an encoding of a translated IGMPv3 report.

FIG. 8 illustrates an embodiment of an encoding of a translated MLDv2 report.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for IGMP/MLD translation. An NE may receive MLD packets from a downstream node, translate the packets into IGMP, and forward the translated packets upstream. The NE may also receive IGMP packets from a downstream node, translate the packets into MLD, and forward the translated packets upstream. The NE may position a proxy on the downstream interface and position the translator on the upstream interface. The NE may also be connected to a plurality of downstream networks. The NE may proxy all downstream networks and may translate less than all networks. The IGMP/MLD translation may be made at the lower layers of the Open System Interconnect (OSI) model (e.g. IP layer and below) without the need to employ upper layer functions (e.g. application layer functions). Also, the IGMP/MLD translation may be a complete and not a mapping, and may be stateless.

The IGMP/MLD translation may be a mechanism for IPv4-IPv6 transition and coexistence. IGMP/MLD translation may enable single-stack (e.g. IPv4-only or IPv6-only) hosts to participate, either as listeners, sources, or both, in multicast groups belonging to different address families. The translation mechanism may be comprise an IGMP/MLD proxy. The translation device may be located at the customer network edge (e.g., in customer-premises equipment (CPE)) at a provider network edge (e.g., in a digital subscriber line (DSL) access multiplexer (DSLAM) for DSL networks, in a cable modem termination system (CMTS) for cable networks, etc.), or any other node reachable by IGMP/MLD packets. The proxy function may be virtual, and may feed its output directly into a multicast router process (e.g., a protocol independent multicast (PIM) daemon) running on the same host as the translating proxy.

Further, the methods and systems disclosed herein may provide translation between IPv4 and IPv6 of multicast flows by an IGMP/MLD proxy. This may allow single-stack nodes to participate in multicast groups from a different address family. Both sending and receiving may be supported by this translation mechanism. Any source multicast (ASM), source specific multicast (SSM), PIM, and other multicast networks may be supported.

Figure 1:
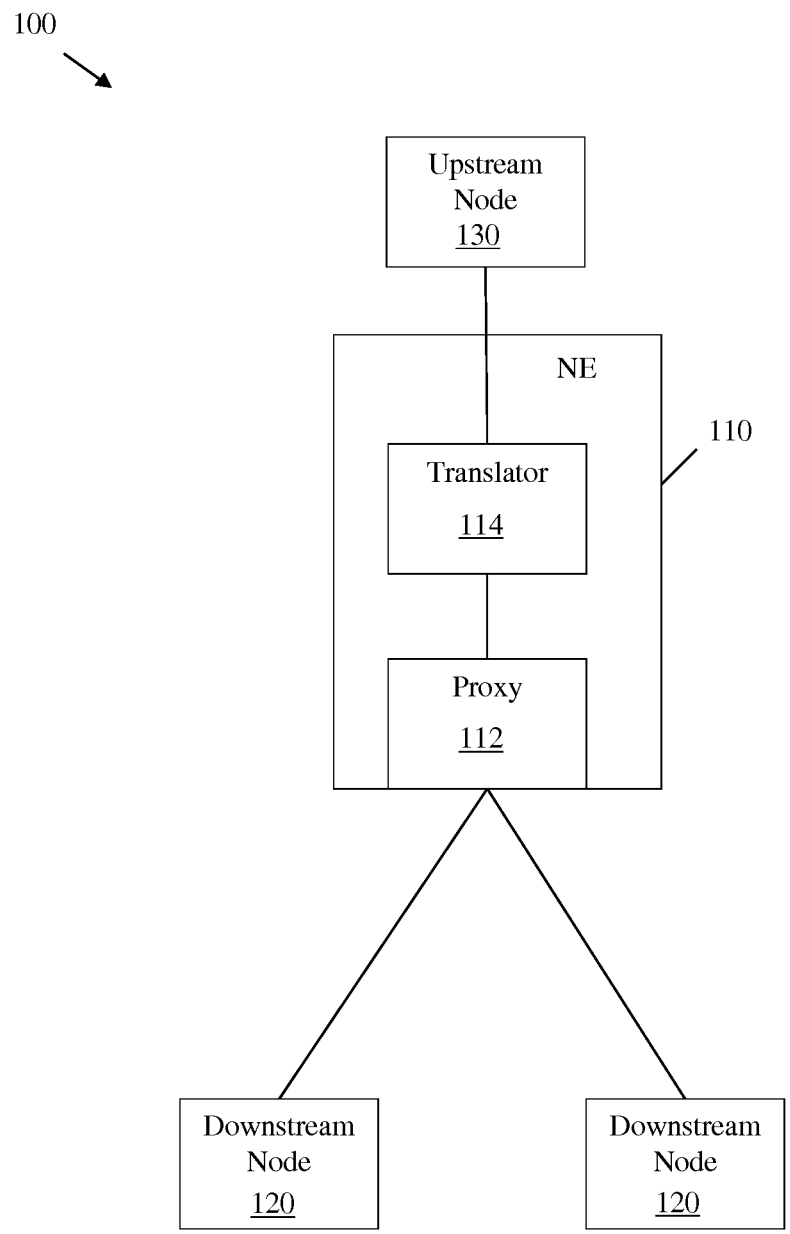
FIG. 1 is a schematic diagram of an embodiment of an IGMP/MLD translation network.

FIG. 1 is a schematic diagram of an embodiment of an IGMP/MLD translation network 100. Network 100 may comprise an upstream node 130, a plurality of downstream nodes 120, and a NE 110. The NE 110 may comprise a proxy 112 and a translator 114. The NE 110 may receive IGMP or MLD messages from downstream nodes 120, proxy the nodes 120, translate IGMP messages to MLD or vice versa, and forward the translated messages to the upstream node 130.

For example, the downstream nodes 120 may be positioned in IPv4 networks and employ IGMP. The upstream node may be positioned in an IPv6, may employ MLD, and may be connected to a multicast network, such a protocol independent multicast (PIM) or other multicast network. Upstream node 130 and downstream nodes 120 may not be dual stack devices and may not be configured perform IPv4/IPv6 conversions. NE 110 may use the proxy 112 and translator 114 to perform translations between MLD and IGPM to allow downstream nodes 120 to access upstream multicast networks. Translator 114 and proxy 112 may be virtual, which may allow NE 110 to perform the translation without dual stack hardware.

The IGMP/MLD proxy 112 may be positioned between the upstream network node 130 and one or more downstream network nodes 120. Proxy 112 may act as a listener and may be positioned in the downstream networks while the rest of the multicast infrastructure may be upstream. Additionally, multiple proxies 112 may be arranged in a tree topology, where one proxy's 112 upstream network is another's proxy's 112 downstream network. The translator 114 may be positioned between the proxy 112 and the upstream network node 130, as shown in FIG. 1.

If the translator 114 and proxy 112 are positioned in the same NE 110, the NE 110 may act as a translating multicast router. Alternatively, translator 114 and proxy 112 may be positioned in more than one NE's 110, in which case the translator may act as a link-layer bridge that modifies the data transiting through it. There may be two reasons for locating the translator upstream of the proxy rather than downstream:

The translator 114 may be positioned upstream from the proxy because translating addresses on downstream interfaces may interfere with Querier elections. For example, IGMP and MLD routers may elect a Querier amongst themselves. The criteria for winning the election may be based on the source address of IGMP/MLD Queries. Positioning a translator 114 on a downstream interface may impose additional constraints on an address mapping scheme. For example, the scheme may be required to ensure the same election result before and after applying a mapping. Such a constraint may be removed when the translation is applied to the upstream interface instead. Since a proxy 112 may act as a client on its upstream interface, the proxy 112 may not participate in Querier elections. As another example, there may only be one upstream interface whereas there may be multiple downstream interfaces. Applying the translator 114 on the upstream interface may require a single translation point, which may facilitate debugging and troubleshooting.

Translation by the translator may be applied to messages sent upstream by a client state machine operating on downstream nodes 120 and to messages received from upstream node 130. These packets may be translated by the translator, but a person of skill in the art will understand that a particular implementation may adopt any internal structure as long as externally observable behavior is consistent with the behavior discussed herein.

Figure 2:
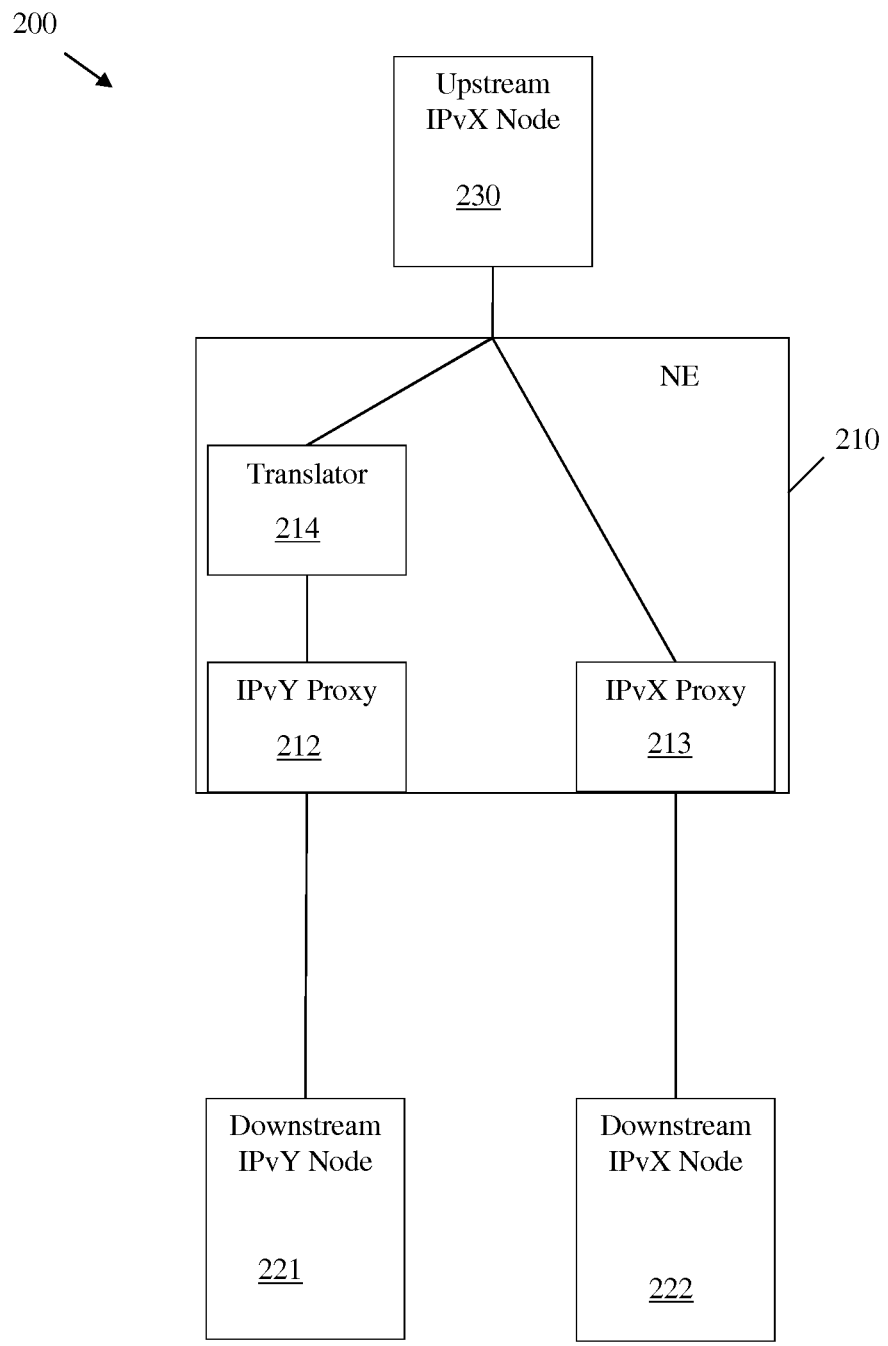
FIG. 2 is a schematic diagram of an embodiment of another IGMP/MLD translation network.

FIG. 2 is a schematic diagram of an embodiment of another IGMP/MLD translation network 200. Network 200 may comprise a NE 210, an upstream node 230, downstream nodes 221 and 222, translator 214, and proxies 212 and 213, which may be similar to NE 110, an upstream node 130, downstream nodes 120, translator 114, and proxy 112. However, downstream nodes 221 and 222 may be positioned in different networks (e.g. IPv4 and IPv6) and upstream node 230 may share a network type with downstream node 222 (e.g. IPv6). NE 210 may proxy 213 and 212 both downstream nodes 221 and 222, but may only translate 214 the downstream node 221 that does not share a network type with the upstream node 230.

In mixed networks, where there may be both IPv4 and IPv6 receivers (e.g. downstream node 221 and downstream node 222), two logical proxies (e.g. proxy 212 and proxy 213) may be employed. Each proxy may maintain a membership state and run state machine in the address families of the receivers it is proxying. For example, proxy 212 may maintain a membership state in the network of downstream node 221 and proxy 213 may maintain a membership state in in the network of downstream node 222. Translation may be applied to only one of them (e.g. downstream node 221).

Figure 3:
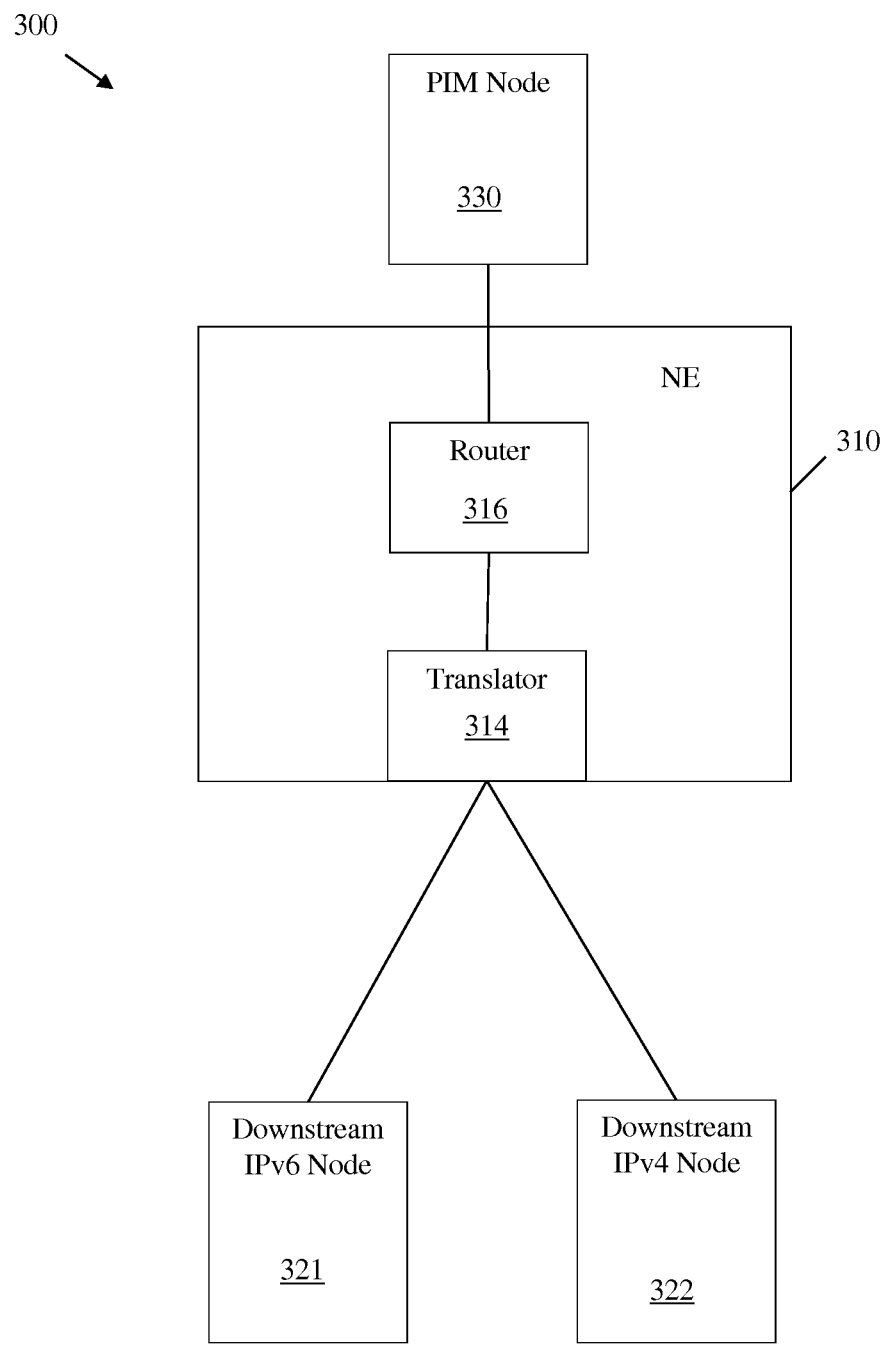
FIG. 3 is a schematic diagram of an embodiment of another IGMP/MLD translation network.

FIG. 3 is a schematic diagram of an embodiment of another IGMP/MLD translation network 300. Network 300 may comprise a NE 310 comprising a translator 314 and a router 316. NE 310 may receive MLD/IGMP messaged from downstream nodes 321 and 322, which may be substantially similar to downstream nodes 221 and 222. NE 310 may translate the messages and employ router 316 to create multicast network messages (e.g. PIM join etc.) The router 316 may then forward such messages to a PIM node 330. As such, the NE 310 may perform IGMP/MLD translation and may operate as a multicast router. When implemented as part of a multicast router, the translator 314 may be positioned on the downstream interfaces, as shown. In this example, the router 316 may transmit PIM messages on an upstream interface and IGMP/MLD on a downstream interface. The translator 314 may be completely virtual.

Figure 4:
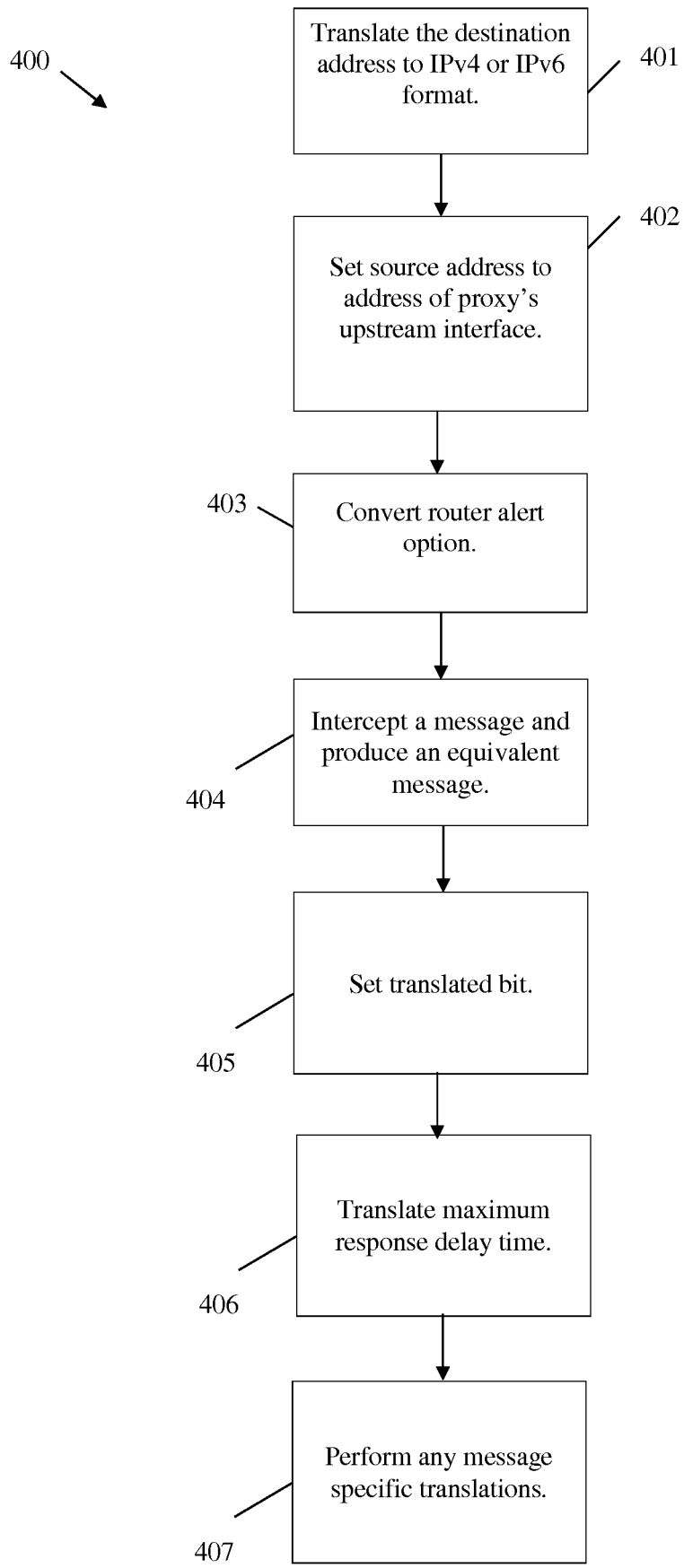
FIG. 4 is a flowchart of an embodiment of IGMP/MLD translation method.

FIG. 4 is a flowchart of an embodiment of IGMP/MLD translation method 400, which may be employed by a NE 110, 210, and/or 310. At step 401, the method 400 may receive a message and translate the destination address from IPv4 to IPv6 or vice versa. Destination addresses may be converted according to Table 1.

TABLE 1

| IPv4/IPv6 Multicast Address Equivalences | | |
|---|---|---|
| Description | IPv4 | IPv6 |
| All nodes on link | 224.0.0.1 | ff02::1 |
| All routers on link | 224.0.0.2 | ff02::2 |
| All IGMP/MLD-capable routers on link | 224.0.0.22 | ff02::16 |

The method 400 may proceed to step 402 and set the message source address to the address of the proxy's upstream interface. Source addresses may be converted as follows: For IGMP to MLD, the source address may be set to a link-local IPv6 address assigned to the proxy's upstream interface. For MLD to IGMP, the source address may be set to the IPv4 address assigned to the proxy's upstream interface. IGMP and MLD Reports having an unspecified source address (0.0.0.0 or ::) may be handled differently. In MLD, they may be dropped. In IGMP, they may be accepted. In order to eliminate this ambiguity, the translator may drop IGMP and MLD reports having an unspecified source address.

The method 400 may proceed to step 403 and convert a router alert option of the message. IGMP messages may be sent with a Router Alert IPv4 option while MLD message may be sent with a Router Alert option in a Hop-By-Hop IPv6 extension header. The translator may convert between these two. In particular, a Router Alert option may be sent on output if it was received on input. The value may be set to zero because the IPv4 and IPv6 value spaces may not be identical.

The method 400 may proceed to step 404, and may intercept the message (e.g. IGMP) and produce an equivalent message (e.g. MLD.) For example, The IGMP/MLD messages may be handled by a translator (e.g. translator 114) that may belong to a proxy's (e.g. proxy 112) upstream interface, on which the proxy may act as a listener. The translation of step 401 may be applied to IGMP/MLD Reports and Leave/Done messages sent from the proxy (e.g. proxy 112) as well as to IGMP/MLD Queries received from routers (e.g. upstream node 130). Upon reception of an IGMP message with a type field containing one of the values listed in Table 2, the translator may intercept the message and produce an equivalent MLD message corresponding to an Internet Control Message Protocol version 6 (ICMPv6) message with the listed type number in the same row. The translator may perform the reverse operation upon reception of an MLD message.

TABLE 2

IGMP/MLD Message Type Equivalences

| IGMP type number | ICMPv6 type number |
|---|---|
| 17 IGMPv1/v2/v3 Query | 130 MLDv1/v2 Query |
| 18 IGMPv1 Report | 131 MLDv1 Report |
| 22 IGMPv2 Report | 131 MLDv1 Report |
| 23 IGMPv2 Leave | 132 MLDv1 Done |
| 34 IGMPv3 Report | 143 MLDv2 Report |

The method 400 may proceed to step 405, and set a translated bit in the translated message. It may be useful, for various reasons including reasons of an operational nature, to include a mechanism allowing the identification of translated traffic. A reserved bit in both IGMPv3 and MLDv2 may be employed for such a purpose. When set to a value of about 1, the translated bit may indicate that a message has been translated according at least once. When set to a value of about 0, the translated bit may indicate that no translation has been performed. A translator may set the Translated bit to about 1 on output. The bit may be ignored on input by default, meaning that a message could be translated twice or more.

The method 400 may proceed to step 406 and translate the messages maximum response delay time. For example, IGMPv2 and IGMPv3 queries may contain a field specifying the Maximum Response Time (MRT), which may be the maximum time allowed before sending a Report, expressed in units of 1/10 seconds. Similarly, MLDv1 and MLDv2 queries may contain a field specifying the Maximum Response Delay (MRD), which may be expressed in units of milliseconds. MLDv1 may encode the MRD value directly as a binary integer. IGMPv2 may encode the MRT value directly as a binary integer. IGMPv3 and MLDv2 may allow a floating-point encoding as well. IGMPv2 and IGMPv3 may use an 8-bit field while MLDv1 and MLDv2 may use a 16-bit field. Embodiments of conversion algorithms may be as follows:

$$\text{IGMPv2 to MLDv1: MRD} = 100 * \text{MRT} \quad \text{Equation 1}$$

All values that can be represented in IGMPv2 may be equivalently represented in MLDv1 without loss of precision.

$$\text{IGMPv3 to MLDv2: MRD} = 100 * \text{MRT} \quad \text{Equation 2}$$

All values that can be represented in IGMPv3 may be equivalently represented in MLDv2 without loss of precision. If MRT<128, both MRT and MRD may be encoded as binary integers. If 128<=MRT<336, MRT may be encoded as a floating-point value while MRD may be encoded as a binary integer. If 336<=MRT, both MRT and MRD may be encoded as floating-point values.

$$\text{MLDv1 to IGMPv2: MRT} = \min(255, \text{round}(\text{MRD}/100)) \quad \text{Equation 3}$$

The MRD may be divided by 100, rounded to the nearest integer, then capped at 255 (may be the largest MRT value representable in IGMPv2). There may be both precision and range loss.

$$\text{MLDv2 to IGMPv3: MRT} = \min(31744, \text{round}(\text{MRD}/100)) \quad \text{Equation 4}$$

The MRD may be divided by 100, rounded to the nearest integer, then capped at 31744 (may be the largest MRT value representible in IGMPv3). There may be both precision and range loss. If MRD<12800, both MRD and MRT may be encoded as binary integers. If 12800<=MRD<32768, MRD may be encoded as a binary integer while MRT may be encoded as a floating-point value. If 32768<=MRD, both MRD and MRT may be encoded as binary integers.

The method 400 may then proceed to step 407 and perform any message specific translations. Depending on the message to be translated, a multicast group address may translated between IPv4 and IPv6 as described in internet engineering task force (IETF) document draft-boucadair-64-multicast-address-format-00, by Boucadair, M. (Boucadair), which is incorporated by reference. Any source addresses (including source address translations at step 402), may be translated as discussed below. In an IGMP to MLD translation, the IPv4 source addresses may be translated as described in IEFT document request for comment (RFC) 6052 by Bao, C., which is incorporated by reference. In an MLD to IGMP translation an IPv4 address may be extracted from an IPv6 source address as described in RFC 6052. MLD messages containing a source address outside the IPv4-Embedded IPv6 Prefix may be dropped unless there exists an applicable statically configured mapping.

As a further example, IGMPv3 and MLDv2 messages and reports may contain Additional Data, as defined in IEFT documents RFC 3376 by Cain, B. and RFC 3810 by Vida, R., which are incorporated by reference. A translator may preserve Additional and Auxiliary Data. This may be accomplished by treating such data as an opaque mass of data and setting the appropriate IPv4 or ICMPv6 length fields appropriately. Maximum transmission unit (MTU) issues may be handled at the application layer and not at the IP layer. The translator may split large Report messages into smaller pieces that fit into an interface's MTU after translation, as described in RFCs 3376 and 3810.

Regarding the transfer of data, the IGMP/MLD translator may be configured either to translate the headers of multicast packets or to encapsulate/decapsulate them. This may apply to regular multicast traffic, and may not apply to IGMP/MLD signaling. The translation may be performed according to IEFT document RFC 6145 by Li, X., which is incorporated by reference, with the address mapping specified in Boucadair. IPv6 packets with a source or destination address outside MPREFIX64 may be dropped unless there exists an applicable statically configured mapping. Encapsulation/decapsulation may be preferable when joining two IPvX islands across an IPvY network (e.g. unconnected IPv4 networks separated by an IPv6 network). Interfaces on which encapsulation/decapsulation takes place may be configured into the translator. When encapsulating, the original packet may not modified. If the message is an IPv6 packet, the message may be encapsulated in an IPv4 packet, and vice-versa. The addresses of the encapsulating packet may be obtained by mapping those of the original packet according to Boucadair. When decapsulating, the original packet may be obtained from the encapsulating packet's payload and may be forwarded as-is as discussed in IETF document RFC 2473 by Conta, A., which is incorporated by reference.

FIG. 5 illustrates an embodiment of an encoding of a translated IGMP v3 query 500. Query 500 may comprise a translated bit 505 which may be set to a value of about 1 to indicate that the message has been translated and to a value of about 0 to indicate that a message has not been translated. In IGMPv3 Query 500, bit number 64 may be the translated bit, as shown in FIG. 5. All other fields may be encoded as discussed in RFC 3376.

FIG. 6 illustrates an embodiment of an encoding of a translated MLDv2 query 600. Query 600 may comprise a translated bit 605 which may be set to a value of about 1 to indicate that the message has been translated and to a value of about 0 to indicate that a message has not been translated. In an MLDv2 Query, bit number 192 may be the translated bit 605, as shown in FIG. 6. All other fields may be encoded as discussed in RFC 3810.

FIG. 7 illustrates an embodiment of an encoding of a translated IGMPv3 report 700. Query 700 may comprise a translated bit 705 which may be set to a value of about 1 to indicate that the message has been translated and to a value of about 0 to indicate that a message has not been translated. In an IGMPv3 Report, bit number 32 may be the translated bit 705, as shown in FIG. 7. All other fields may be encoded as discussed in RFC 3376.

FIG. 8 illustrates an embodiment of an encoding of a translated MLDv2 report 800. Query 800 may comprise a translated bit 805 which may be set to a value of about 1 to indicate that the message has been translated and to a value of about 0 to indicate that a message has not been translated. In an MLDv2 Report, bit number 32 may be the translated bit 805, as shown in FIG. 8. All other fields may be encoded as discussed in RFC 3810.

Figure 9:
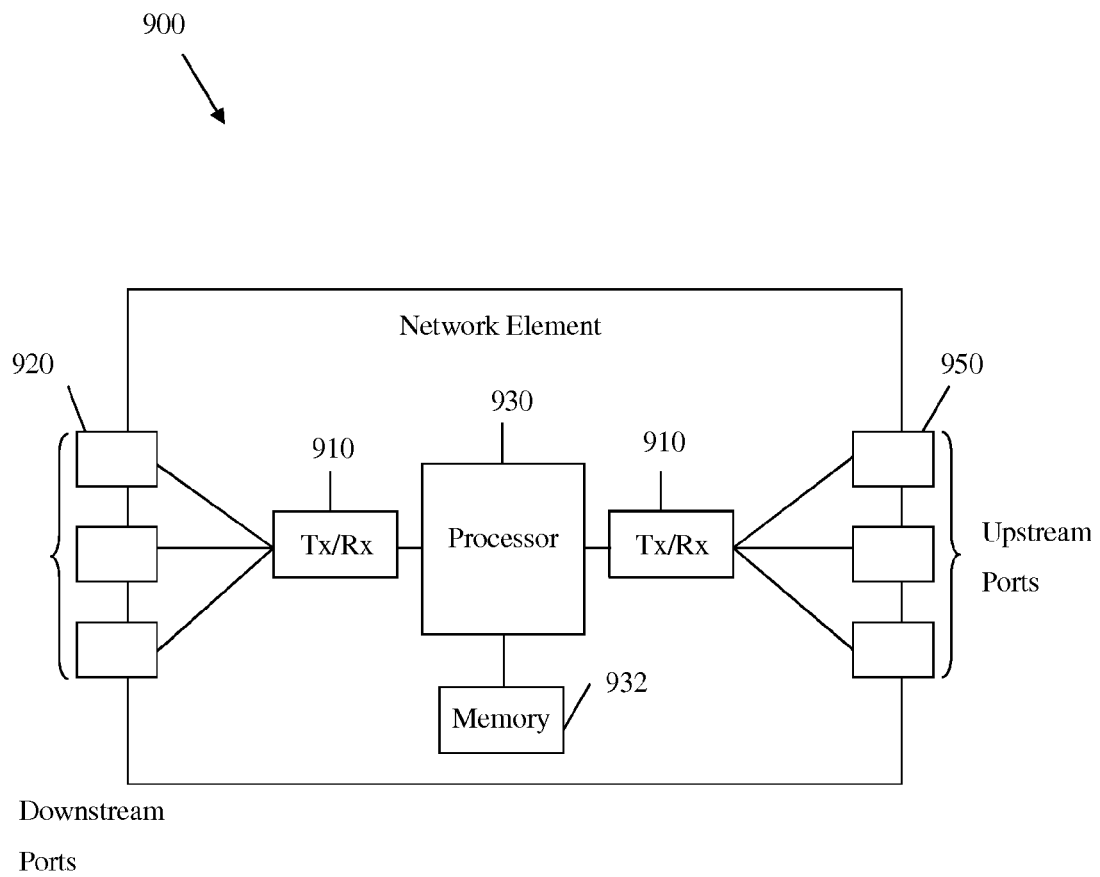
FIG. 9 is a schematic diagram of an embodiment of a NE.

FIG. 9 is a schematic diagram of an embodiment of a NE 900, which may function as a node in network 100, 200, and/or 300, for example NE 110, 210, and/or 330, and/or nodes 120, 130, 221, 222, 230, 321, 322, and/or 330. One skilled in the art will recognize that the term NE encompasses a broad range of devices of which NE 900 is merely an example. NE 900 is included for purposes of clarity of discussion, but is in no way meant to limit the application of the present disclosure to a particular NE embodiment or class of NE embodiments. At least some of the features/methods described in the disclosure may be implemented in a network apparatus or component, such as an NE 900. For instance, the features/methods in the disclosure may be implemented using hardware, firmware, and/or software installed to run on hardware. The NE 900 may be any device that transports frames through a network. As shown in FIG. 9, the NE 900 may comprise transceivers (Tx/Rx) 910, which may be transmitters, a receiver, or combinations thereof. A Tx/Rx 910 may be coupled to plurality of downstream ports 920 for transmitting and/or receiving frames from other nodes, a Tx/Rx 910 coupled to plurality of upstream ports 950 for transmitting and/or receiving frames from other nodes and/or antennas, and a processor 930 coupled to the Tx/Rxs 910 to process the frames and/or determine which nodes to send frames to. NE 900 may or may not make network routing decisions. The processor 930 may comprise one or more multi-core processors and/or memory devices 932, which may function as data stores. The processor 930 may be configured to implement any of the schemes described herein, such as the IGMP/MLD translation method 400, and may be implemented using hardware, software, or both. The downstream ports 920 and/or upstream ports 950 may contain electrical and/or optical transmitting and/or receiving components.

It is understood that by programming and/or loading executable instructions onto the NE 900, at least one of the processor 930, memory 932, and/or Tx/Rx 910 are changed, transforming the NE 900 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Multiple embodiments are disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: R=R1+k*(Ru−R1), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A network element (NE) comprising:
   at least one receiver configured to:
      receive an Internet Group Management Protocol (IGMP) message in Internet Protocol version four (IPv4) format from a downstream IPv4 node; and
      receive an Internet Protocol version six (IPv6) format Multicast Listener Discovery (MLD) message from a downstream IPv6 node;
   at least one processor coupled to the receiver, the processor comprising:
      an IPv4 proxy comprising an upstream interface and configured to act as a multicast client for the downstream IPv4 node by setting a source address of the IGMP message to an address of the IPv4 proxy upstream interface;
      an IPv6 proxy comprising an upstream interface and configured to act as a multicast client for the downstream IPv6 node by setting a source address of the MLD message to an address of the IPv6 proxy upstream interface; and
      a translator configured to translate the IGMP message from the IPv4 proxy into a translated MLD message in IPv6 format while not applying translation to messages from the IPv6 Proxy resulting in an untranslated MLD message, wherein translating the IGMP message into the translated MLD message comprises translating an IGMP leave message into an MLD done message; and
   a transmitter coupled to the processor and configured to forward the translated MLD message and the untranslated MLD message towards an upstream multicast router.

2. The NE of claim 1, wherein translating the IGMP message does not comprise application layer functions.

3. The NE of claim 1, wherein translating the IGMP message comprises converting data of the IGMP message, and wherein translating the IGMP message does not comprise stateful data mapping.

4. The NE of claim 1, wherein the translator is not positioned upstream of the IPv6 proxy.

5. The NE of claim 1, wherein the translated MLD message comprises a source address, wherein the NE comprises an upstream interface, and wherein translating the IGMP message comprises setting the source address of the translated MLD message to a link-local IPv6 address assigned to the NE's upstream interface.

6. A network element (NE) comprising:
   a receiver configured to receive an Multicast Listener Discovery (MLD) report in Internet Protocol version six (IPv6) format from a downstream IPv6 node;
   at least one processor coupled to the receiver, the processor comprising:
      an IPv4 proxy comprising an upstream interface and configured to act as a multicast client for a downstream IPv4 node by setting a source address of a Internet Group Management Protocol (IGMP) report from the downstream IPv4 node to an address of the IPv4 proxy upstream interface;
      an IPv6 proxy comprising an upstream interface and configured to act as a multicast client for the downstream IPv6 node by setting a source address of the MLD report to an address of the IPv6 proxy upstream interface; and
      a translator positioned upstream from the IPv6 proxy and configured to translate the MLD report from the IPv6 proxy into an Internet Protocol version four (IPv4) Internet Group Management Protocol (IGMP) report; and
   a transmitter coupled to the processor and configured to forward the translated IGMP report or the IGMP report from the IPv4 proxy towards an upstream multicast router, wherein the NE is further configured to:
  receive an MLD done message from the downstream IPv6 node;
  translate the MLD done message into an IGMP leave message; and
  forward the translated IGMP leave message toward the upstream multicast router.

7. The NE of claim 6, wherein the IGMP report comprises a source address, wherein the NE comprises an upstream interface, and wherein translating the MLD report comprises setting the source address of the IGMP report resulting from the translation to an IPv4 address assigned to the NE's upstream interface.

8. The NE of claim 6, wherein translating the MLD report further comprises converting a router alert option in a hop-by-hop IPv6 extension header to a router alert IPv4 option.

9. The NE of claim 6, wherein the processor is further configured to:
  proxy a downstream IPv4 node and maintain an IPv4 membership state machine; and
  maintain an IPv6 membership state machine at the IPv6 proxy to proxy the downstream IPv6 node.

10. The NE of claim 9, wherein the NE is further configured to:
  forward translated IPv6 multicast data packets to the downstream IPv6 node; and
  forward IPv4 multicast data packets to the downstream IPv4 node without translation.

11. The NE of claim 6, wherein translating the MLD report further comprises setting a translation bit in the IGMP report to indicate that the IGMP report has been translated from another format.

12. The NE of claim 11, wherein the translated IGMP report comprises a reserved field, and wherein the translation bit is located in the reserved field.

13. The NE of claim 6, wherein translating the MLD report further comprises converting a maximum response time (MRT) from MLD version 1 (v1) format to IGMP version 2 (v2) format or converting the MRT from MLDv2 format to IGMP version 3 (v3) format.

14. A method comprising:
  receiving a plurality of Internet Group Management Protocol (IGMP) packets from a downstream Internet Protocol (IP) version four (IPv4) network;
  receiving a plurality of Multicast Listener Discovery (MLD) packets from a downstream IP version six (IPv6) network;
  employing an IPv4 proxy and an IPv6 proxy to maintain a membership state in both the IPv4 network and the IPv6 network;
  translating the IGMP packets into translated MLD packets, wherein translating the IGMP packets into translated MLD packets comprise translating at least one IGMP leave packet into an MLD done packet; and
  forwarding the MLD packets and the translated MLD packets to a multicast router,
  wherein translating the IGMP packets into the translated MLD packets comprises:
    intercepting the IGMP packet and producing an equivalent translated MLD packet;
    translating a destination address from the IGMP packet into IPv6 format for transmission in the translated MLD packet;
    setting a source address of the translated MLD packet to a link-local IPv6 address assigned to the IPv6 proxy's upstream interface;
    converting a Router Alert IPv4 option from the IGMP packet to a Router Alert option in a Hop-By-Hop IPv6 extension header for transmission in the translated MLD packet; and
    setting a translated bit of the translated MLD packet to indicate the translated MLD packet has been translated.

15. The method of claim 14, further comprising dropping all packets received from an unspecified source.

* * * * *